(12) United States Patent
Hwang et al.

(10) Patent No.: US 11,350,406 B2
(45) Date of Patent: May 31, 2022

(54) REMOTE RADIO UNIT FOR PROCESSING UPLINK TRANSMISSION AND DOWNLINK TRANSMISSION THROUGH TIME DIVISION SCHEME IN CLOUD RAN ENVIRONMENT, AND OPERATING METHOD THEREOF

(71) Applicant: Samsung Electronics Co., Ltd., Suwon-si (KR)

(72) Inventors: Yoonjun Hwang, Suwon-si (KR); Daeho Sohn, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 170 days.

(21) Appl. No.: 15/733,248

(22) PCT Filed: Dec. 11, 2018

(86) PCT No.: PCT/KR2018/015663
§ 371 (c)(1),
(2) Date: Jun. 16, 2020

(87) PCT Pub. No.: WO2019/124848
PCT Pub. Date: Jun. 27, 2019

(65) Prior Publication Data
US 2020/0389892 A1 Dec. 10, 2020

(30) Foreign Application Priority Data
Dec. 18, 2017 (KR) .......................... 10-2017-0174164

(51) Int. Cl.
*H04B 7/26* (2006.01)
*H04W 72/04* (2009.01)

(52) U.S. Cl.
CPC .............................. *H04W 72/0446* (2013.01)

(58) Field of Classification Search
CPC .................................................. H04W 72/0446
See application file for complete search history.

(56) References Cited

U.S. PATENT DOCUMENTS

| 8,705,483 B2 | 4/2014 | Liu |
| 2013/0279452 A1* | 10/2013 | Liu .................. H04W 72/1268 370/329 |
| 2014/0226736 A1 | 8/2014 | Niu et al. |
| 2015/0043396 A1 | 2/2015 | Ekpenyong |
| 2015/0229464 A1 | 8/2015 | Trojer et al. |

(Continued)

FOREIGN PATENT DOCUMENTS

| KR | 10-2016-0133503 A | 11/2016 |
| KR | 10-2017-0098798 A | 8/2017 |

OTHER PUBLICATIONS

Notice of Non-final Rejection dated Oct. 25, 2021, in connection with Korean Application No. 10-2017-0174164, 7 pages.

(Continued)

*Primary Examiner* — Melvin C Marcelo

(57) ABSTRACT

The disclosure relates to a remote radio unit for processing uplink transmission and downlink transmission by using a time division scheme, and an operating method thereof. According to an embodiment of the disclosure, a remote radio unit may determine to switch to downlink transmission or to uplink transmission, and switch to one of a fast Fourier transform mode and an inverse fast Fourier transform mode based on a result of the determining.

20 Claims, 11 Drawing Sheets

(56) References Cited

U.S. PATENT DOCUMENTS

| | | |
|---|---|---|
| 2015/0244430 A1 | 8/2015 | Shattil |
| 2016/0183248 A1 | 6/2016 | Niu et al. |
| 2016/0270080 A1* | 9/2016 | Zeng ........................ H04L 5/06 |
| 2017/0251493 A1 | 8/2017 | Zhang |
| 2020/0235788 A1* | 7/2020 | Rajagopal .............. H04B 7/024 |
| 2021/0119674 A1* | 4/2021 | Yuan .................... H04L 5/0053 |

OTHER PUBLICATIONS

International Search Report and Written Opinion of the International Searching Authority in connection with International Application No. PCT/KR2018/015663 dated Mar. 21, 2019, 22 pages.

* cited by examiner

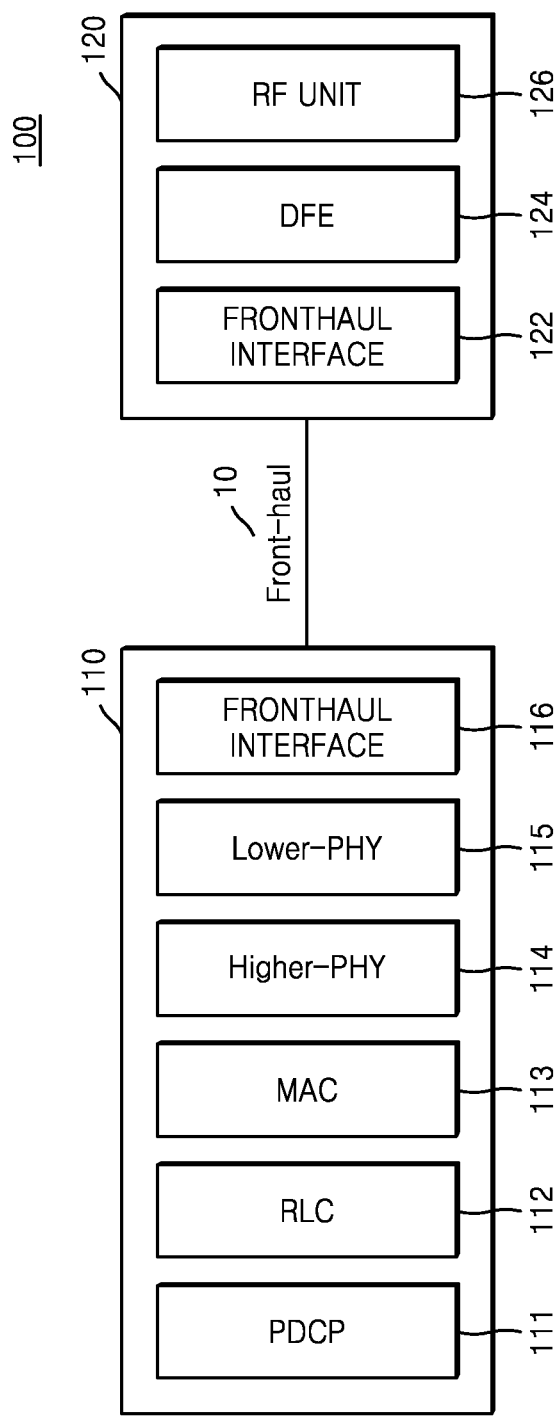

REMOTE RADIO UNIT FOR PROCESSING UPLINK TRANSMISSION AND DOWNLINK TRANSMISSION THROUGH TIME DIVISION SCHEME IN CLOUD RAN ENVIRONMENT, AND OPERATING METHOD THEREOF

CROSS-REFERENCE TO RELATED APPLICATIONS

This application is a 371 National Stage of International Application No. PCT/KR2018/015663, filed Dec. 11, 2018, which claims priority to Korean Patent Application No. 10-2017-0174164, filed Dec. 18, 2017, the disclosures of which are herein incorporated by reference in their entirety.

BACKGROUND

1. Field

The disclosure relates to a remote radio unit for processing uplink transmission and downlink transmission by using a time division scheme and an operating method thereof, and more specifically, to a remote radio unit for performing control according to whether to switch to uplink transmission or to downlink transmission and an operating method thereof.

2. Description of Related Art

A cloud radio access network (C-RAN) environment is a network environment where a base station is divided into a remote radio unit and a baseband unit. In the C-RAN environment, as the amount of data to be processed by the base station increases, a frequency bandwidth to be endured by a fronthaul connecting the remote radio unit to the baseband unit also gradually increases.

A functional split structure has been proposed as a method of reducing a size of the frequency bandwidth to be endured by the fronthaul. As one of the functional split structures, a structure in which a physical (PHY) layer of the baseband unit is divided into a higher-physical (higher-PHY) layer and a lower-PHY layer, and then the split lower-physical (lower-PHY) layer is implemented by the remote radio unit has been discussed. However, when the lower-PHY layer is implemented by the remote radio unit, resources of the remote radio unit increase, and thus, a solution for reducing the resources used by the remote radio unit when the lower-PHY layer is implemented by the remote radio unit is required.

SUMMARY

Various embodiments provide a remote radio unit performing control according to whether to switch to uplink transmission or to downlink transmission, and an operating method thereof.

BRIEF DESCRIPTION OF THE DRAWINGS

FIG. 1 is a block diagram illustrating a cloud radio access network (C-RAN) environment.

DETAILED DESCRIPTION

Figure 2A:
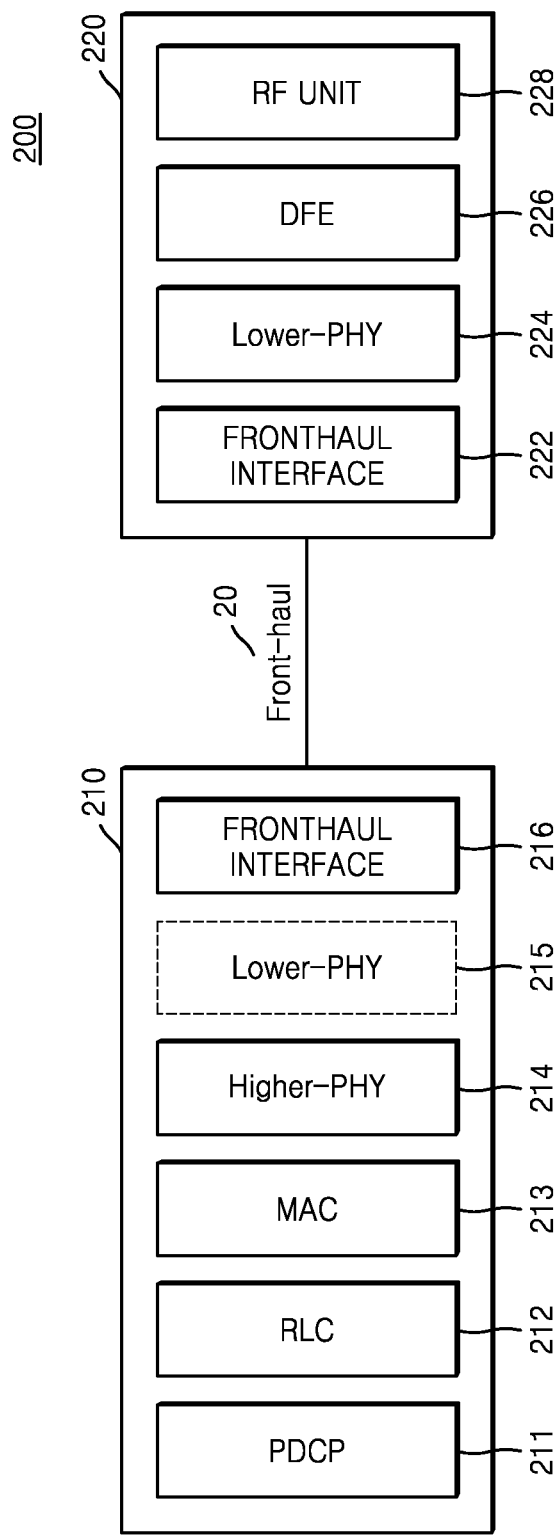
FIGS. 2A to 2C are block diagrams illustrating a C-RAN environment according to an embodiment.

According to an embodiment, a method, performed by a remote radio unit, of processing uplink transmission and downlink transmission by using a time division scheme may include: determining whether to switch to downlink transmission or to uplink transmission; and switching to one of a fast Fourier transform mode and an inverse fast Fourier transform mode based on a result of the determining.

According to an embodiment, a remote radio unit for processing uplink transmission and downlink transmission by using a time division scheme may include: a transceiver configured to transmit and receive signals to and from a user equipment; a memory in which at least one program is stored; and at least one processor configured to execute the at least one program to process the uplink transmission or the downlink transmission by using a time division scheme, wherein the at least one processor may be further configured to determine whether to switch to the downlink transmission or to the uplink transmission, and switch to one of a fast Fourier transform mode and an inverse fast Fourier transform mode based on a result of the determining.

According to an embodiment, a computer-readable recording medium may have recorded thereon a program for executing a method, performed by a remote radio unit, of processing uplink transmission and downlink transmission by using a time division scheme, wherein the method may include: determining whether to switch to downlink transmission or to switch to uplink transmission; and switching to one of a fast Fourier transform mode and an inverse fast Fourier transform mode based on a result of the determining.

Hereinafter, embodiments will be described in detail with reference to the accompanying drawings for one of ordinary skill in the art to be able to perform the embodiments without any difficulty. However, it should be understood that the disclosure may be embodied in different ways and is not limited to the embodiments described herein. In addition, portions irrelevant to the description will be omitted from the drawings for a clear description of the disclosure, and like elements will be denoted by like reference numerals throughout the specification.

Although terms used in the present specification may be used to explain various elements, the elements should not be limited by these terms. These terms are used only for the purpose of distinguishing one element from another element.

The accompanying drawings may be schematically illustrated to explain embodiments of the disclosure, and some dimensions may be exaggerated for clarity. Similarly, a considerable portion of the drawings may be arbitrarily expressed.

The term "unit" or "module" used in the disclosure should be interpreted to include software, hardware, or a combination thereof according to the context in which the term is used. For example, the software may refer to machine language, firmware, embedded code, and application software. As another example, the hardware may refer to a circuit, a processor, a computer, an integrated circuit, an integrated circuit core, a sensor, a micro-electro-mechanical system (MEMS), a passive device, or a combination thereof.

In the disclosure, an uplink refers to a radio link by which a user equipment (UE) or a mobile station (MS) transmits data or a control signal to a base station (BS) or eNode B, and a downlink refers to a radio link by which a BS transmits data or a control signal to a UE.

The embodiments described in the disclosure and the accompanying drawings are provided to explain the disclosure through some of various embodiments of the disclosure, and the disclosure is not limited to the embodiments described in the disclosure and the accompanying drawings.

According to an embodiment of the disclosure, a method, performed by a remote radio unit, of processing uplink transmission and downlink transmission by using a time division scheme may include: determining whether to switch to downlink transmission or to uplink transmission; and switching to one of a fast Fourier transform mode and an inverse fast Fourier transform mode based on a result of the determining.

According to an embodiment, the switching to one of the fast Fourier transform mode and the inverse fast Fourier transform mode may include adjusting a period of time-domain data of the uplink transmission or the downlink transmission.

According to an embodiment, the switching to one of the fast Fourier transform mode and the inverse fast Fourier transform mode may further include, when the uplink transmission is switched to the downlink transmission, switching to the inverse fast Fourier transform mode, and the adjusting of the period of the time-domain data may include, when the uplink transmission is switched to the downlink transmission, increasing a period of time-domain data of the downlink transmission.

According to an embodiment, the switching to the inverse fast Fourier transform mode may include transforming frequency-domain data of the downlink transmission into time-domain data, and the increasing of the period of the time-domain data of the downlink transmission may include increasing a period of the transformed time-domain data of the downlink transmission.

According to an embodiment, the increasing of the period of the time-domain data of the downlink transmission may include increasing the period such that time-domain data of the downlink transmission transformed in a first time domain is processed in a second time domain.

According to an embodiment, the adjusting of the period of the time-domain data may include, when the downlink transmission is switched to the uplink transmission, decreasing a period of time-domain data of the uplink transmission, and the switching to one of the fast Fourier transform mode and the inverse fast Fourier transform mode may further include, when the downlink transmission is switched to the uplink transmission, switching to the fast Fourier transform mode.

According to an embodiment, the switching to the fast Fourier transform mode may include transforming the time-domain data of the uplink transmission having the decreased period into frequency-domain data.

According to an embodiment, the decreasing of the period of the time-domain data of the uplink transmission may include reducing the period such that time-domain data of the uplink transmission processed in the second time domain is processed in the first time domain.

According to an embodiment of the disclosure, a remote radio unit for processing uplink transmission and downlink transmission by using a time division scheme may include: a transceiver transmitting and receiving signals to and from a user equipment; a memory in which at least one program is stored; and at least one processor configured to execute the at least one program to process the uplink transmission or the downlink transmission by using a time division scheme, wherein the at least one processor may be further configured to determine whether to switch to the downlink transmission or to the uplink transmission, and switch to one of a fast Fourier transform mode and an inverse fast Fourier transform mode based on a result of the determining.

According to an embodiment, the at least one processor may be further configured to adjust a period of time-domain data of the uplink transmission or the downlink transmission.

According to an embodiment, the at least one processor may be further configured to, when the uplink transmission is switched to the downlink transmission, switch to the inverse fast Fourier transform mode and increase a period of time-domain data of the downlink transmission.

According to an embodiment, the at least one processor may be further configured to transform frequency-domain data of the downlink transmission into time-domain data and increase a period of the transformed time-domain data of the downlink transmission.

According to an embodiment, the at least one processor may be further configured to increase the period such that time-domain data of the downlink transmission transformed in a first time domain is processed in a second time domain.

According to an embodiment, the at least one processor may be further configured to, when the downlink transmission is switched to the uplink transmission, decrease a period of time-domain data of the uplink transmission and switch to the fast Fourier transform mode.

According to an embodiment, the at least one processor may be further configured to transform the time-domain data of the uplink transmission having the decreased period into frequency-domain data.

According to an embodiment, the at least one processor may be further configured to decrease the period such that time-domain data of the uplink transmission processed in the second time domain is processed in the first time domain.

According to an embodiment, in a computer-readable recording medium having recorded thereon a program for executing a method, performed by a remote radio unit, of processing uplink transmission and downlink transmission by using a time division scheme, the method may include: determining whether to switch to downlink transmission or to switch to uplink transmission; and switching to one of a fast Fourier transform mode and an inverse fast Fourier transform mode based on a result of the determining.

Hereinafter, the disclosure will be described in detail with reference to the accompanying drawings.

FIG. 1 is a block diagram illustrating a cloud radio access network (C-RAN) environment.

As illustrated in FIG. 1, in the C-RAN environment 100, a baseband unit 110 may be responsible for processing a packet data convergence protocol (PDCP) layer 111, a radio link control (RLC) layer 112, a media access control (MAC) layer 113, a higher-physical (higher-PHY) layer 114, and a lower-physical (lower-PHY) layer 115, and may include a fronthaul interface 116 for communication with a remote radio unit 120. Each layer of the baseband unit 110 may sequentially process data, and data output from the lower-PHY layer 115 may be transmitted to the remote radio unit 120 via a fronthaul 10.

The remote radio unit 120 may include a fronthaul interface 122, a decision feedback equalization (DFE) 124, and an radio frequency (RF) unit 126.

The fronthaul interface 122 may connect the remote radio unit 120 to the fronthaul 10 to mediate communication between the remote radio unit 120 and the baseband unit 110.

The remote radio unit 120 may receive data output from the lower-PHY layer 115 of the baseband unit 110 via the fronthaul 10.

The DFE 124 may add a decision value and a weighted value to a received signal and then feedback equalize the signal, thereby reducing an error between symbols generated due to signal distortion.

The RF unit 126 may transmit and receive signals to and from the UE. For example, the RF unit 126 may include an RF transmitter for up-transforming and amplifying a frequency of a transmitted signal, and an RF receiver for low-noise amplifying and down-transforming a received signal.

In the C-RAN environment 100 illustrated in FIG. 1, the lower-PHY layer 115 that performs modulation and demodulation is processed by the baseband unit 110. Accordingly, data processed cumulatively in the order of the PDCP layer 111, the RLC layer 112, the MAC layer 113, and the lower-PHY layer 115 may be transferred to the remote radio unit 120 via the fronthaul 10.

In this case, the amount of data may increase as the data passes through each layer. In particular, data output from the lower-PHY layer 115 and transferred to the remote radio unit 120 via the fronthaul interface 116 may include in-phase quadrature (IQ) data obtained by sampling a baseband signal and digitalizing the sampled baseband signal, and the IQ data may be larger in size than data output from the higher-PHY layer.

Figure 2B:
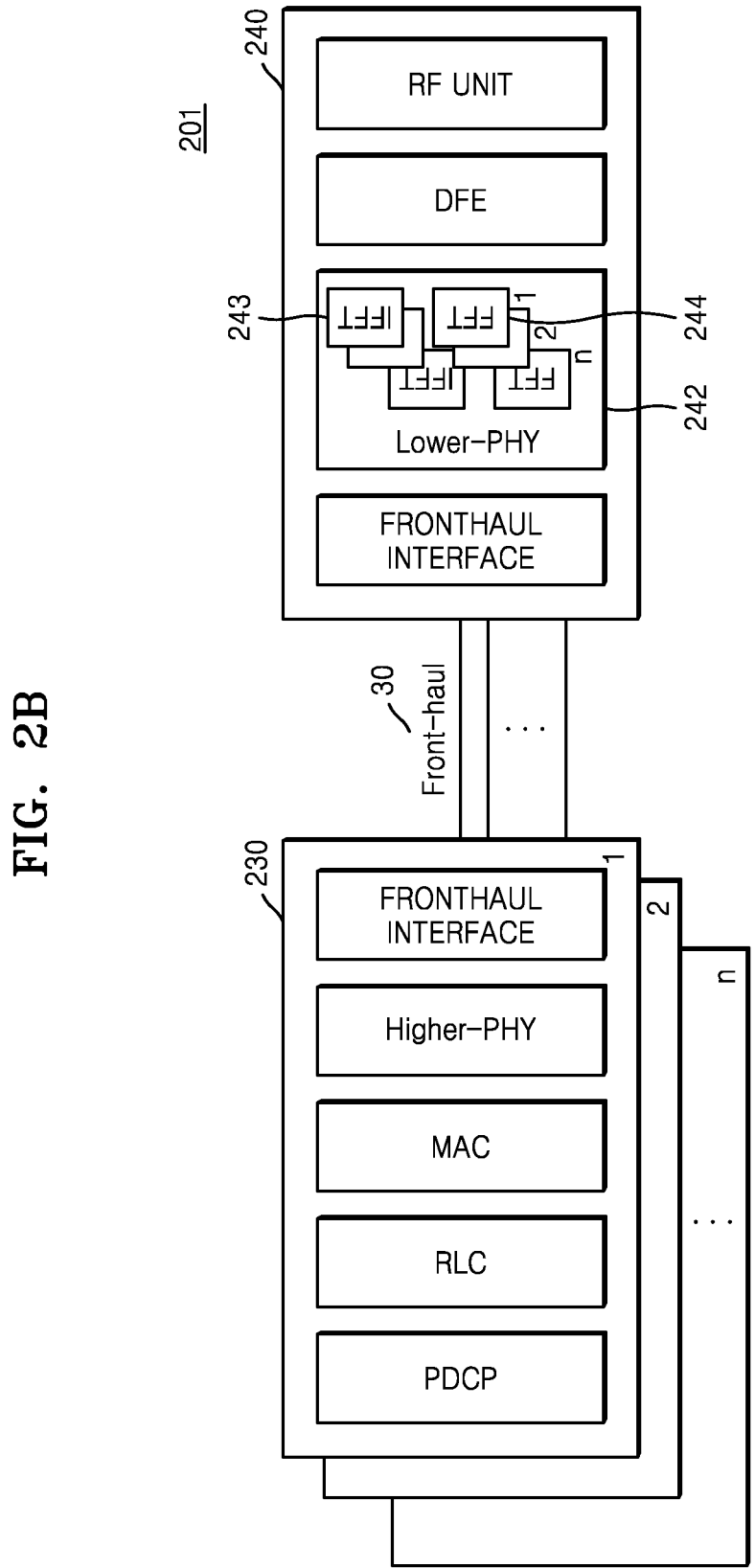
Figure 2C:
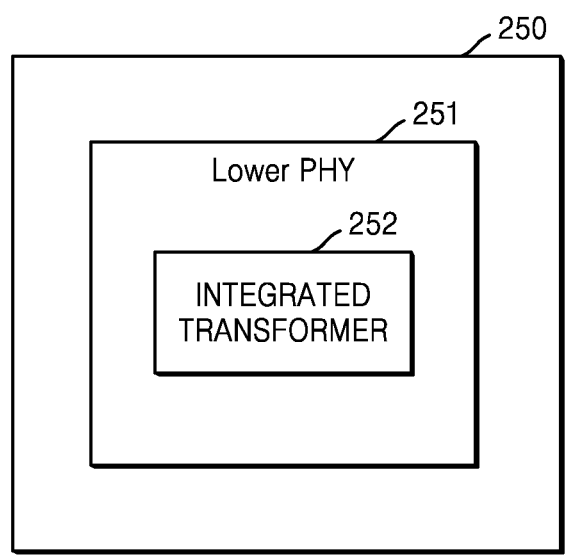

FIGS. 2A to 2C are block diagrams illustrating a C-RAN environment according to an embodiment.

FIG. 2A is a block diagram illustrating a C-RAN environment to which a functional split structure is applied, according to an embodiment.

Here, a repeated description as in the description of FIG. 1 will be briefly described.

As illustrated in FIG. 2A, in the C-RAN environment 200, a baseband unit 210 may be responsible for processing a PDCP layer 211, an RLC layer 212, a MAC layer 213, and a higher-PHY layer 214, and may include a fronthaul interface 216. A remote radio unit 220 may include a fronthaul interface 222, a DFE 226, and an RF unit 228, and may be responsible for the processing of a lower-PHY layer 224. The baseband unit 210 and the remote radio unit 220 may communicate via a fronthaul 20.

Unlike FIG. 1, in the embodiment illustrated in FIG. 2A, a lower-PHY layer 215 separated from the higher-PHY layer 214 may be processed by the remote radio unit 220 instead of the baseband unit 210. As described above, the amount of data may increase as the data passes through each layer in the baseband unit 210. According to the C-RAN environment 200 illustrated in FIG. 2A, because the lower-PHY layer 224 that performs modulation and demodulation is processed by the remote radio unit 220 instead of the baseband unit 210, the amount of data transferred via the fronthaul 20 may be reduced when compared with the amount of data transferred via the fronthaul 10 as illustrated in FIG. 1.

FIG. 2B is a block diagram illustrating a C-RAN environment to which a functional split structure is applied, according to an embodiment.

Here, a repeated description as in the descriptions of FIGS. 1 and 2A will be briefly described.

In the C-RAN environment 201, at least one baseband unit 230 may be connected to one remote radio unit 240 via at least one fronthaul 30. For example, n baseband units 230 may be connected to one remote radio unit 240 via n fronthauls 30.

In an embodiment, a lower-PHY layer 242 processed by the remote radio unit 240 may include at least one inverse fast Fourier transformer 243 for performing modulation associated with each of the at least one baseband unit 230 and at least one fast Fourier transformer 244 for performing demodulation associated with each of the at least one baseband unit 230.

For example, as illustrated in FIG. 2B, the lower-PHY layer 242 may include n inverse fast Fourier transformers 243 for performing modulation associated with each of the n baseband units 230, and n fast Fourier transformers 244 for performing demodulation associated with each of the n baseband units 230.

Resources required by the lower-PHY layer 242 to perform modulation or demodulation may be correlated (for example, proportionally related) with the total number of inverse fast Fourier transformers and fast Fourier transformers included in the lower-PHY layer 242. For example, the resources required for the lower-PHY layer 242 to perform modulation or demodulation may increase in proportion to $2n$.

When the lower-PHY layer 242 performs modulation and demodulation in a separate transformer, a relatively large quantity of transformers are required for modulation and demodulation, when compared to a case where modulation and demodulation are performed in a single integrated transformer. Accordingly, the lower-PHY layer 242 that performs modulation and demodulation in a separate transformer consumes a relatively large quantity of resources when compared to the case where modulation and demodulation are performed in a single integrated transformer.

According to an embodiment, the inverse fast Fourier transformer 243 and the fast Fourier transformer 244 may be implemented as a single integrated transformer. For example, in FIG. 2B, n inverse fast Fourier transformers 243 and n fast Fourier transformers 244 may be implemented as n integrated transformers. Accordingly, resources required when the lower-PHY layer 242 performs modulation and demodulation may be reduced, and a detailed description thereof will be described with reference to the block diagram of FIG. 2C.

FIG. 2C is a block diagram illustrating a lower-PHY layer processed by a remote wireless unit according to an embodiment.

In an embodiment, a lower-PHY layer 251 processed by a remote radio unit 250 may include an integrated transformer 252 that performs both modulation and demodulation in a single transformer. Because the lower-PHY layer 251 performs modulation and demodulation by using the integrated transformer 252, modulation and demodulation may be performed by using only half of the number of transformers used when the lower-PHY layer 242 of FIG. 2B performs modulation and demodulation.

Accordingly, the remote radio unit 250 may modulate or demodulate a downlink signal or an uplink signal while consuming a relatively small number of resources, when compared to the remote radio unit 240 illustrated in FIG. 2B.

Time division duplex (TDD) refers to a scheme in which downlink transmission and uplink transmission are processed using a time division scheme while using the same frequency. The remote radio unit 250 according to an embodiment may modulate or demodulate downlink transmission or uplink transmission by using a time division scheme via TDD.

Figure 3:
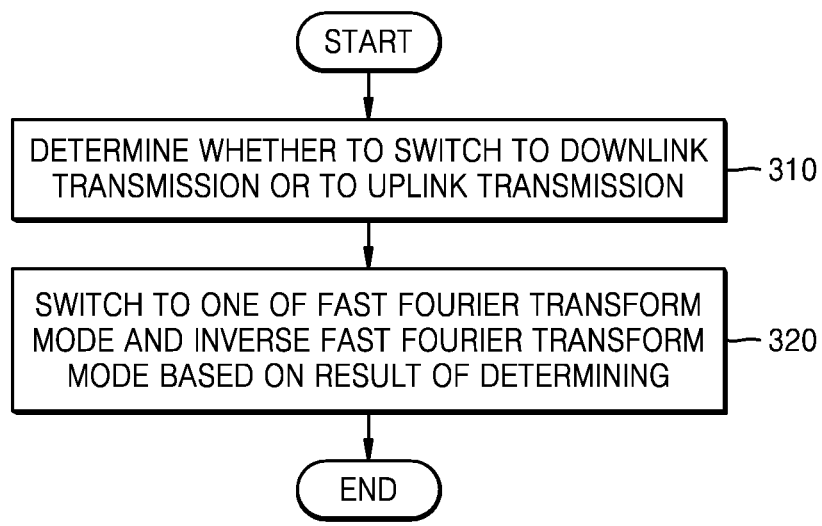
FIG. 3 is a flowchart illustrating a method, performed by a remote radio unit, of processing uplink transmission and downlink transmission by using a time division scheme, according to an embodiment.

FIG. 3 is a flowchart illustrating a method, performed by a remote radio unit, of processing uplink transmission and downlink transmission by using a time division scheme, according to an embodiment.

In operation 310, the remote radio unit 250 may determine whether to switch to downlink transmission or to uplink transmission.

In an embodiment, the remote radio unit 250 may determine whether to switch from uplink transmission to downlink transmission or from downlink transmission to uplink transmission. More specifically, the remote radio unit 250 may determine whether to switch from a time duration for processing an uplink signal to a time duration for processing a downlink signal or from a time duration for processing a downlink signal to a time duration for processing an uplink signal.

In operation 320, the remote radio unit 250 may switch to one of a fast Fourier transform mode and an inverse fast Fourier transform mode based on a result of the determining. More specifically, the remote radio unit 250 may switch a transform mode of the integrated transformer 252 of the lower-PHY layer 251 to one of the fast Fourier transform mode and the inverse fast Fourier transform mode based on the result of the determining.

The remote radio unit 250 according to an embodiment may perform fast Fourier transform on the uplink signal in response to the switching to the fast Fourier transform mode. More specifically, the remote radio unit 250 may perform fast Fourier transform that transforms time-domain data of the uplink transmission into frequency-domain data in response to the transform mode of the integrated transformer 252 being switched to the fast Fourier transform mode.

In addition, the remote radio unit 250 may perform inverse fast Fourier transform on the downlink signal in response to the switching to the inverse fast Fourier transform mode. More specifically, the remote radio unit 250 may perform inverse fast Fourier transform that transforms frequency-domain data of the downlink transmission into time-domain data in response to the transform mode of the integrated transformer 252 being switched to the inverse fast Fourier transform mode.

The remote radio unit 250 according to an embodiment may adjust a period of time-domain data of the uplink transmission or the downlink transmission. More specifically, when the transform mode is switched to one of the fast Fourier transform mode and the inverse fast Fourier transform mode, the remote radio unit 250 may adjust the period of time-domain data of the uplink transmission or the downlink transmission.

Figure 4:
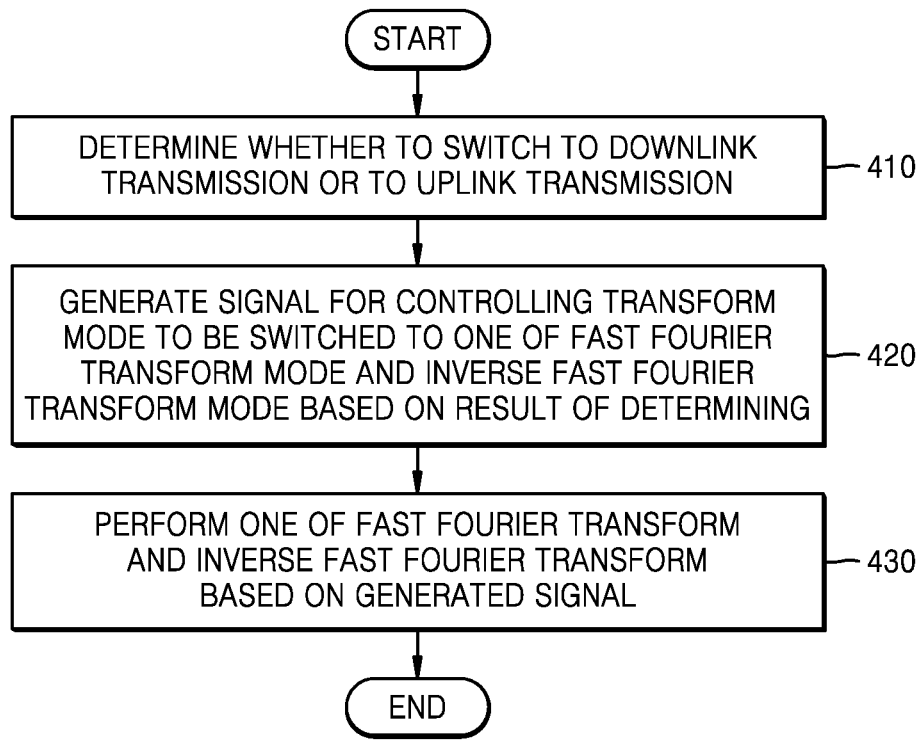
FIG. 4 is a flowchart illustrating a method, performed by a remote radio unit, of processing uplink transmission and downlink transmission by using a time division scheme, according to another embodiment.

FIG. 4 is a flowchart illustrating a method, performed by a remote radio unit, of processing uplink transmission and downlink transmission by using a time division scheme according to another embodiment.

Here, a repeated description as in the description of FIG. 3 will be briefly described.

In operation 410, the remote radio unit 250 may determine whether to switch to downlink transmission or uplink transmission.

In operation 420, the remote radio unit 250 may generate a signal for controlling a transform mode to be switched to one of the fast Fourier transform mode and the inverse fast Fourier transform mode based on a result of the determining.

In an embodiment, the remote radio unit 250 may generate a signal for controlling the transform mode of the integrated transformer 252 of the lower-PHY layer 251 to be switched to one of the fast Fourier transform mode and the inverse fast Fourier transform mode based on the result of the determining.

In operation 430, the remote radio unit 250 may perform one of the fast Fourier transform and the inverse fast Fourier transform based on the generated signal. More specifically, the integrated transformer 252 of the lower-PHY layer 251 processed by the remote radio unit 250 may perform one of the fast Fourier transform and the inverse fast Fourier transform based on the generated signal.

Figure 5:
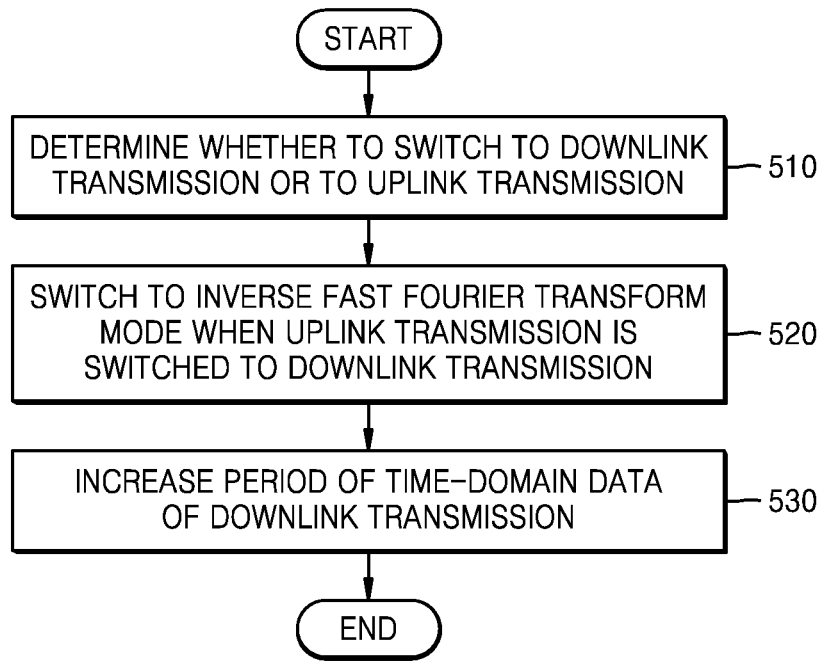
FIG. 5 is a flowchart illustrating a method, performed by a remote radio unit, of processing downlink transmission, according to an embodiment.

FIG. 5 is a flowchart illustrating a method, performed by a remote radio unit, of processing downlink transmission, according to an embodiment.

Here, a repeated description as in the description of FIG. 3 or 4 will be briefly described.

In operation 510, the remote radio unit 250 may determine whether to switch to downlink transmission or uplink transmission.

In operation 520, when the uplink transmission is switched to the downlink transmission, the remote radio unit 250 may switch to the inverse fast Fourier transform mode.

In an embodiment, when the uplink transmission is switched to the downlink transmission, the remote radio unit 250 may switch the transform mode of the integrated transformer 252 of the lower-PHY layer 251 to the inverse fast Fourier transform mode. More specifically, when a time duration for processing an uplink signal is switched to a time duration for processing a downlink signal, the remote radio unit 250 may switch the transform mode of the integrated transformer 252 of the lower-PHY layer 251 from the fast Fourier transform mode to the inverse fast Fourier transform mode.

In operation 530, the remote radio unit 250 may increase a period of time-domain data of the downlink transmission. A detailed description of the remote radio unit 250 increasing the period of the time-domain data of the downlink transmission will be described at a later time with reference to FIG. 8.

Figure 6:
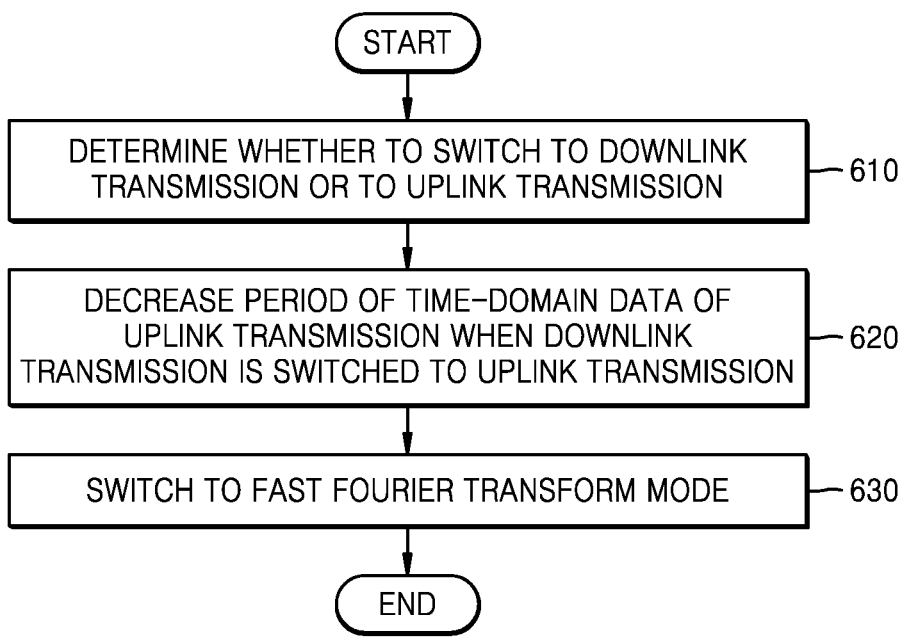
FIG. 6 is a flowchart illustrating a method, performed by a remote radio unit, of processing uplink transmission, according to an embodiment.

FIG. 6 is a flowchart illustrating a method, performed by a remote radio unit, of processing uplink transmission, according to an embodiment.

Here, a repeated description as in the descriptions of FIGS. 3 through 5 will be briefly described.

In operation 610, the remote radio unit 250 may determine whether to switch to downlink transmission or uplink transmission.

In operation 620, when the downlink transmission is switched to the uplink transmission, the remote radio unit 250 may decrease a period of time-domain data of the uplink transmission. A detailed description of the remote radio unit 250 decreasing the period of the time-domain data of the uplink transmission will be described at a later time with reference to FIG. 9.

In operation 630, the remote radio unit 250 may switch to the fast Fourier transform mode.

In an embodiment, when the downlink transmission is switched to the uplink transmission, the remote radio unit 250 may switch the transform mode of the integrated transformer 252 of the lower-PHY layer 251 to the fast Fourier transform mode. More specifically, when a time duration for processing a downlink signal is switched to a time duration for processing an uplink signal, the remote radio unit 250 may switch the transform mode of the integrated transformer 252 of the lower-PHY layer 251 from the inverse fast Fourier transform mode to the fast Fourier transform mode.

Figure 7:
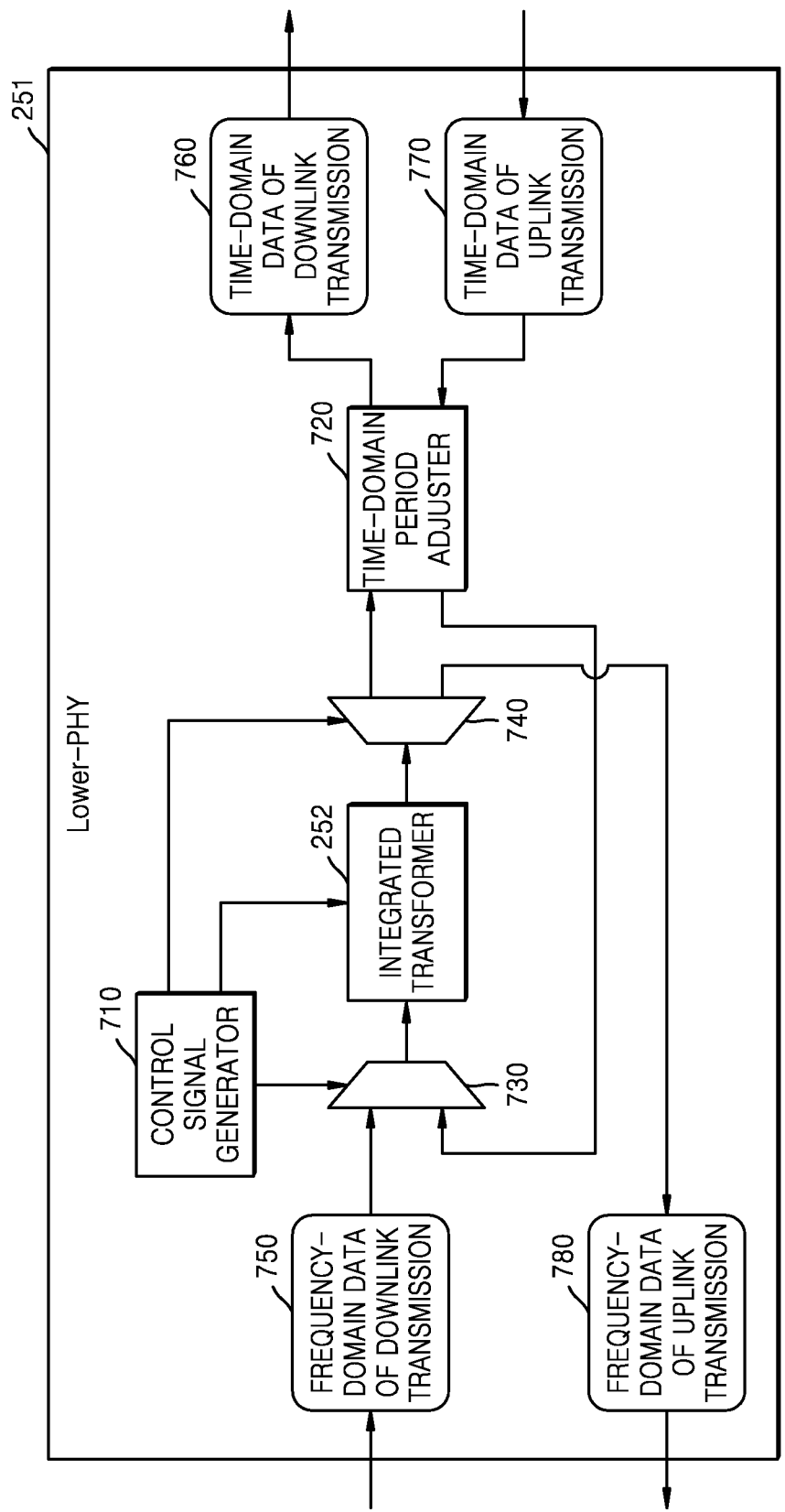
FIG. 7 is a block diagram illustrating a configuration of a lower-physical (PHY) layer according to an embodiment.

FIG. 7 is a block diagram illustrating a configuration of a lower-PHY layer according to an embodiment.

The lower-PHY layer 251 may include a control signal generator 710, an integrated transformer 252, a time-domain period adjuster 720, at least one multiplexer 730, and at least one demultiplexer 740.

The integrated transformer 252 according to an embodiment may switch to one of the fast Fourier transform mode and the inverse fast Fourier transform mode by using a time division scheme. The integrated transformer 252 may perform transformation according to the switched transform mode.

The control signal generator 710 may generate a signal for controlling the integrated transformer 252 to switch to one of the fast Fourier transform mode and the inverse fast Fourier transform mode. The integrated transformer 252 may perform one of the fast Fourier transform and the inverse fast Fourier transform based on the signal generated by the control signal generator 710.

The time-domain period adjuster 720 may adjust a period of time-domain data of uplink transmission or downlink transmission.

A process in which the lower-PHY layer 251 according to an embodiment processes downlink transmission is as follows. When the uplink transmission is switched to the downlink transmission, the control signal generator 710 may generate a signal for controlling the integrated transformer 252 to switch to the inverse fast Fourier transform mode. The control signal generator 710 may control the multiplexer 730 to select frequency-domain data 750 of downlink transmission according to the generated control signal. The integrated transformer 252 may switch to the inverse fast Fourier transform mode based on the signal generated by the control signal generator 710. When the frequency-domain data 750 of downlink transmission is transferred to the integrated transformer 252 via the multiplexer 730, the integrated transformer 252 may perform the inverse fast Fourier transform that transforms the frequency-domain data 750 into time-domain data. The control signal generator 710 may control the demultiplexer 740 to transfer the transformed time-domain data to the time-domain period adjuster 720 according to the generated control signal. When the transformed time-domain data is transferred to the time-domain period adjuster 720 via the demultiplexer 740, the time-domain period adjuster 720 may increase a period of the time-domain data. The time-domain data 760 having the increased period may be transmitted to the UE via the transceiver of the remote radio unit 250.

A process in which the lower-PHY layer 251 according to an embodiment processes uplink transmission is as follows. When the downlink transmission is switched to the uplink transmission, the control signal generator 710 may generate a signal for controlling the integrated transformer 252 to switch to the fast Fourier transform mode. The integrated transformer 252 may switch to the fast Fourier transform mode based on the signal generated by the control signal generator 710. When the time-domain data 770 of the uplink transmission is transferred to the time-domain period adjuster 720, the time-domain period adjuster 720 may decrease a period of time-domain data 770. The control signal generator 710 may control the multiplexer 730 to select the time-domain data 770 having the decreased period according to the generated control signal. When the time-domain data having the reduced period is transferred to the integrated transformer 252 via the multiplexer 730, the integrated transformer 252 may perform fast Fourier transform that transforms the time-domain data having the decreased period into frequency-domain data 780. The control signal generator 710 may control the demultiplexer 740 to transmit the transformed frequency-domain data 780 to the fronthaul interface of the remote radio unit 250 according to the generated control signal. The transformed frequency-domain data 780 may pass through the demultiplexer 740 to be transferred to the baseband unit via the fronthaul interface of the remote radio unit 250.

The order of operations performed in the process in which the lower-PHY layer 251 according to an embodiment processes uplink transmission or downlink transmission is not limited to the order described in the above-described embodiment.

Figure 8:
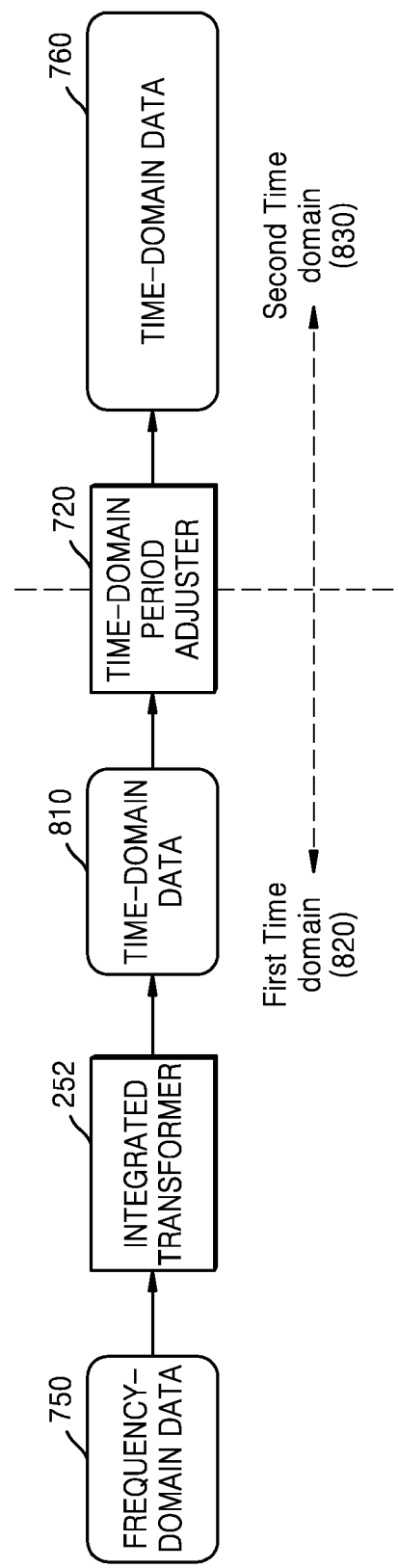
FIG. 8 is a diagram illustrating a process in which a remote radio unit processes downlink transmission according to an embodiment.

FIG. 8 is a diagram illustrating a process in which a remote radio unit processes downlink transmission according to an embodiment.

The integrated transformer 252 according to an embodiment may perform inverse fast Fourier transform that transforms the frequency-domain data 750 into time-domain data 810.

The time-domain period adjuster 720 according to an embodiment may increase a period of the time-domain data 810. More specifically, the time-domain period adjuster 720 may increase the period such that time-domain data 810 of the downlink transmission transformed in a first time domain 820 is operatable in a second time domain 830. The second time domain 830 may have a longer period than the first time domain 820.

The second time domain 830 according to an embodiment may refer to a domain using a data sampling clock, and the first time domain 820 may refer to a domain using a clock that is faster than the data sampling clock in order to improve the accuracy of transformation between time-domain data and frequency-domain data.

A ratio of the period of the first time domain 820 to the period of the second time domain 830 may be a fixed constant, but the disclosure is not limited thereto. The ratio of the period of the first time domain 820 to the period of the second time domain 830 may vary at regular time intervals or may vary due to variations in internal or external environment of the remote radio unit 250.

Figure 9:
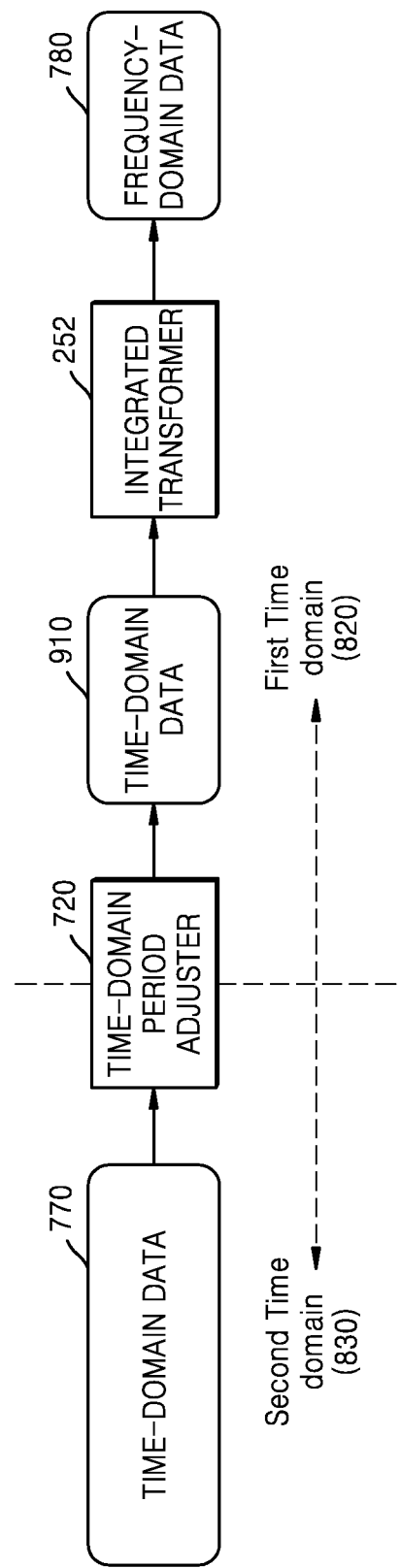
FIG. 9 is a diagram illustrating a process in which a remote radio unit processes uplink transmission according to an embodiment.

FIG. 9 is a diagram illustrating a process in which a remote radio unit processes uplink transmission according to an embodiment.

The time-domain period adjuster 720 according to an embodiment may decrease a period of the time-domain data 770. More specifically, the time-domain period adjuster 720 may decrease the period such that the time-domain data 770 processed in the second time domain 830 is operatable in the first time domain 820. The first time domain 820 may be a time domain having a shorter period than the second time domain 830.

The integrated transformer 252 may perform fast Fourier transform that transforms time-domain data 910 into the frequency-domain data 780. More specifically, the integrated transformer 252 may perform fast Fourier transform that transforms the time-domain data 910 having a decreased period to be operatable in the first time domain 820 into the frequency-domain data 780.

Figure 10:
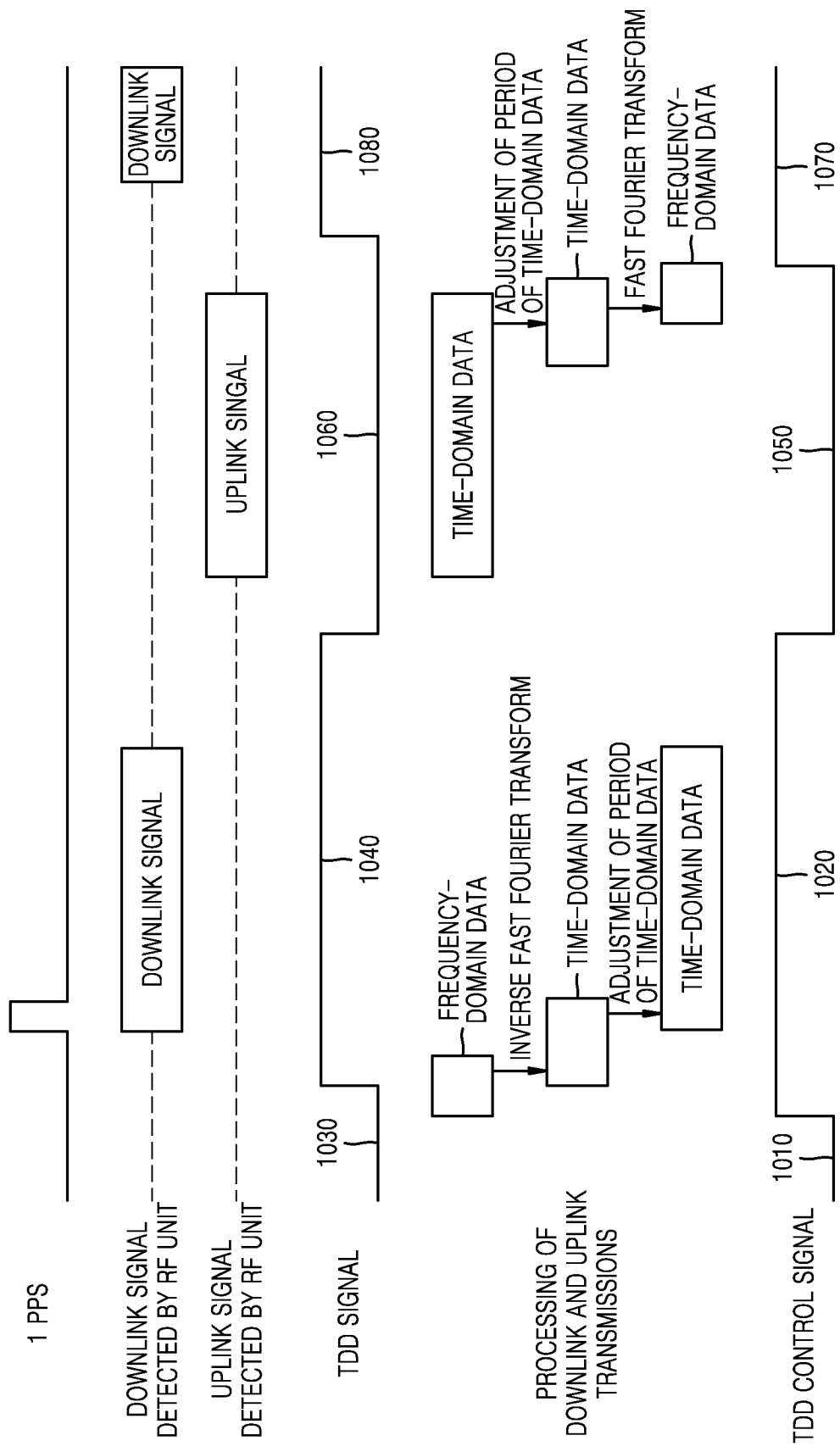
FIG. 10 is a diagram illustrating a process in which a remote radio unit processes downlink transmission and uplink transmission over time, according to an embodiment.

FIG. 10 is a diagram illustrating a process in which a remote radio unit processes downlink transmission and uplink transmission over time, according to an embodiment.

Before the remote radio unit 250 according to an embodiment performs inverse fast Fourier transform of frequency-domain data into time-domain data in downlink transmission, a TDD control signal generated by the control signal generator 710 may be switched from a low (or "0") signal 1010 to a high (or "1") signal 1020. When the TDD control signal generated by the control signal generator 710 is switched from the low signal 1010 to the high signal 1020, a TDD signal may be switched from a low signal 1030 to a high signal 1040. In a time duration where the TDD signal is the high signal 1040, the remote radio unit 250 may process downlink transmission.

In an embodiment, when the TDD signal is switched from the low signal 1030 to the high signal 1040, the remote radio unit 250 may determine that uplink transmission has been switched to downlink transmission. Accordingly, the remote radio unit 250 may switch the transform mode of the integrated transformer 252 into the inverse fast Fourier transform mode.

In an embodiment, when the remote radio unit 250 performs inverse fast Fourier transform of frequency-domain data into time-domain data in downlink transmission and a period of the transformed time-domain data is adjusted, the TDD control signal generated by the control signal generator 710 may be switched from a high signal 1020 to a low signal 1050. When the TDD control signal generated by the control signal generator 710 is switched from the high signal 1020 to the low signal 1050, the TDD signal may be switched from the high signal 1040 to a low signal 1060. In a time duration where the TDD signal is the low signal 1060, the remote radio unit 250 may process uplink transmission.

After the remote radio unit 250 according to an embodiment performs fast Fourier transform of time-domain data into frequency-domain data in uplink transmission, the TDD control signal generated by the control signal generator 710 may be switched from the low signal 1050 to a high signal 1070. When the TDD control signal generated by the control signal generator 710 is switched from the low signal 1050 to the high signal 1070, the TDD signal may be switched from the low signal 1060 to a high signal 1080. In a time duration where the TDD signal is the high signal 1080, the remote radio unit 250 may process downlink transmission.

A process in which the remote radio unit 250 according to an embodiment processes downlink transmission and uplink transmission may be synchronized by a global positioning system (GPS) in a cycle of 1 pps, that is, every 1 second, but is not limited thereto. For example the process by the remote radio unit 250 processes downlink transmission and uplink transmission may be synchronized by the GPS every 2 seconds.

In FIGS. 3 through 10, the order of operations performed by the remote radio unit 250 according to an embodiment in the process of processing uplink transmission or downlink transmission may be partially different in other embodiments.

Figure 11:
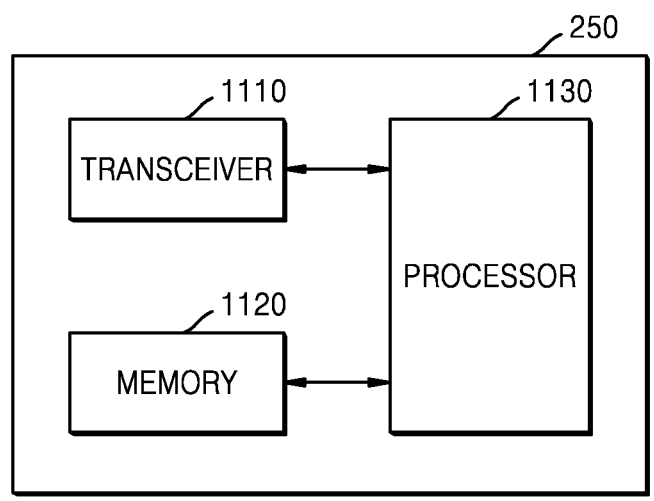
FIGS. 11 and 12 are block diagrams illustrating a configuration of a remote radio unit according to an embodiment.
Figure 12:
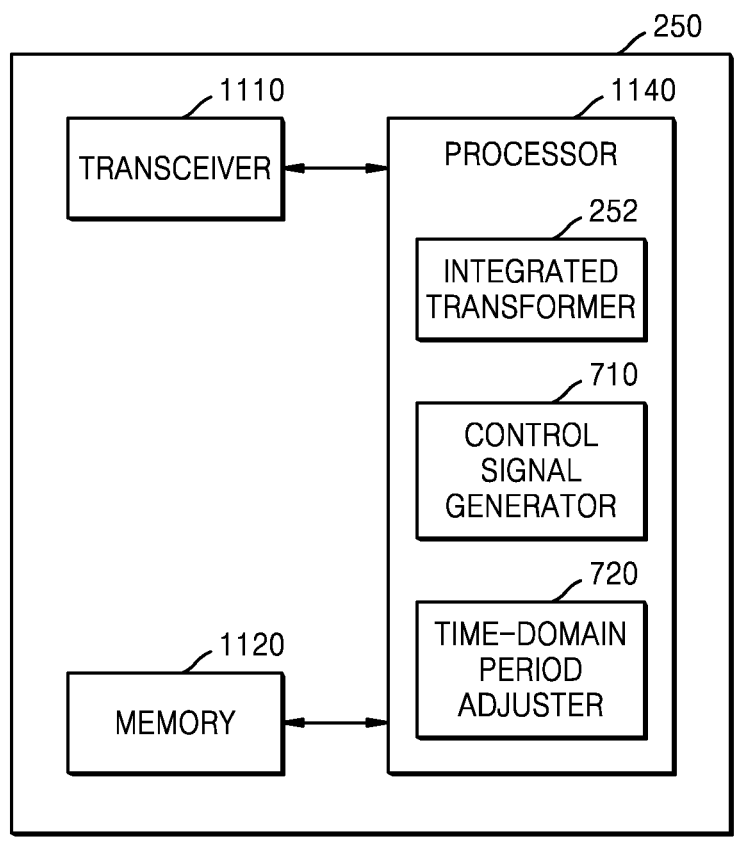

FIGS. 11 and 12 are block diagrams illustrating a configuration of a remote radio unit according to an embodiment.

The elements of the remote radio unit 250 illustrated in FIGS. 11 and 12 may perform operations of the remote radio unit 250 illustrated in FIGS. 2A through 10, and a detailed description that is repeated in the descriptions of FIGS. 2A to 10 will be omitted.

As illustrated in FIG. 11, the remote radio unit 250 according to an embodiment may include a transceiver 1110, a memory 1120, and a processor 1130. However, all the elements illustrated in FIG. 11 are not essential elements of the remote radio unit 250. The remote radio unit 250 may be implemented with more or less elements than those illustrated in FIG. 11. In addition, in the remote radio unit 250 according to an embodiment, the transceiver 1110, the memory 1120, and the processor 1130 may be implemented by one chip.

The transceiver 1110 according to an embodiment may transmit and receive a signal to and from a UE. Here, the signal may include control information or data. The transceiver 1110 may include an RF unit, and the RF unit may include an RF transmitter and an RF receiver.

The transceiver 1110 may transmit time-domain data of downlink transmission to the UE. In addition, the transceiver 1110 may receive time-domain data of uplink transmission from the UE.

The processor 1130 according to an embodiment may control overall operations of the remote radio unit 250. For example, the processor 1130 may perform functions or operations of the remote radio unit 250 described with reference to FIGS. 2A through 10. In addition, the processor 1130 may control overall elements included in the remote radio unit 250, such as the transceiver 1110, the memory 1120, and the like.

In an embodiment, the processor 1130 may determine whether to switch to downlink transmission or to uplink transmission.

Further, the processor 1130 may switch to one of the fast Fourier transform mode and the inverse fast Fourier transform mode according to a result of the determining.

The memory 1120 according to an embodiment may store at least one program for processing and controlling the processor 1130, and may store a signal input to or output from the remote radio unit 250.

In an embodiment, the processor 1130 may process uplink transmission or downlink transmission by using a time division scheme by executing the at least one program stored in the memory 1120.

Although not shown in the drawing, the remote radio unit 250 according to an embodiment may further include a fronthaul interface configured to transmit, to the baseband unit, frequency-domain data of uplink transmission transferred via the demultiplexer 740.

In addition, the remote radio unit 250 may receive, frequency-domain data of downlink transmission from the baseband unit via the fronthaul interface.

As illustrated in FIG. 12, a processor 1140 included in the remote radio unit 250 according to an embodiment may include an integrated transformer 252, a control signal generator 710, and a time-domain period adjuster 720. However, all the elements included in the processor 1140 of FIG. 12 are not essential elements of the processor 1140. The processor 1140 may be implemented with more or less elements than the elements included in the processor 1140 of FIG. 12. In addition, in the processor 1140 according to an embodiment, the integrated transformer 252, the control signal generator 710, and the time-domain period adjuster 720 may be implemented by one chip.

The integrated transformer 252 according to an embodiment may switch to one of the fast Fourier transform mode and the inverse fast Fourier transform mode by using a time division scheme.

The control signal generator 710 may generate a signal for controlling the integrated transformer 252 to switch to one of the fast Fourier transform mode and the inverse fast Fourier transform mode. The integrated transformer 252 may perform one of the fast Fourier transform and the inverse fast Fourier transform based on the signal generated by the control signal generator 710.

The time-domain period adjuster 720 may adjust a period of time-domain data of uplink transmission or downlink transmission. The embodiments of the disclosure described above are only illustrative, and it will be understood by those of ordinary skill in the art that various changes in form and details may be made therein without changing the technical spirit and mandatory features of the disclosure. Therefore, the embodiments should be understood in the illustrative sense only and not for the purpose of limitation in all aspects. For example, each element described as a single type may be carried out by being distributed, and likewise, elements described as a distributed type may also be carried out by being coupled.

The term "remote radio unit" used in the aforementioned description of the disclosure may be referred to as an RRU, a remote radio head (RRH), or the like, and the term "baseband unit" may be referred to as a BBU or the like.

The scope of the disclosure may be defined by the appended claims to be described below, and it should be understood that the meaning and scope of the claims and all changed or modified forms derived from the equivalent concept of the claims are included in the scope of the disclosure.

The invention claimed is:

1. A method, performed by a remote radio unit, of processing uplink transmission and downlink transmission by using a time division scheme in a cloud radio access network (C-RAN) environment where the remote radio unit is separated from a baseband unit, the method comprising:
   determining whether to switch to the downlink transmission or to the uplink transmission; and
   switching to one of a fast Fourier transform mode and an inverse fast Fourier transform mode based on a result of the determining.

2. The method of claim 1, wherein the switching to one of the fast Fourier transform mode and the inverse fast Fourier transform mode comprises adjusting a period of time-domain data of the uplink transmission or the downlink transmission.

3. The method of claim 2, wherein the switching to one of the fast Fourier transform mode and the inverse fast Fourier transform mode further comprises, when the uplink transmission is switched to the downlink transmission, switching to the inverse fast Fourier transform mode, and
   the adjusting of the period of the period of the time-domain data comprises, when the uplink transmission is switched to the downlink transmission, increasing the period of the time-domain data of the downlink transmission.

4. The method of claim 3, wherein the switching to the inverse fast Fourier transform mode comprises transforming frequency-domain data of the downlink transmission into time-domain data, and
   the increasing of the period of the time-domain data of the downlink transmission comprises increasing a period of the transformed time-domain data of the downlink transmission.

5. The method of claim 4, wherein the increasing of the period of the time-domain data of the downlink transmission comprises, increasing the period of the time-domain data of the downlink transmission such that the time-domain data of the downlink transmission transformed in a first time domain is processed in a second time domain.

6. The method of claim 2, wherein the adjusting of the period of the period of the time-domain data comprises, when the downlink transmission is switched to the uplink transmission, decreasing the period of the time-domain data of the uplink transmission, and
   the switching to one of the fast Fourier transform mode and the inverse fast Fourier transform mode further comprises, when the downlink transmission is switched to the uplink transmission, switching to the fast Fourier transform mode.

7. The method of claim 6, wherein the switching to one of the fast Fourier transform mode comprises, transforming the time-domain data of the uplink transmission having the decreased period into frequency-domain data.

8. The method of claim 7, wherein the decreasing of the period of the time-domain data of the uplink transmission comprises, decreasing the period of the time-domain data of the uplink transmission such that the time-domain data of the uplink transmission processed in a second time domain is processed in a first time domain.

9. A remote radio unit for processing uplink transmission and downlink transmission by using a time division scheme in a cloud radio access network environment where the remote radio unit is separated from a baseband unit, the remote radio unit comprising:
   a transceiver configured to transmit and receive signals to and from a user equipment (UE);
   a memory in which at least one program is stored; and
   at least one processor configured to execute the at least one program to process the uplink transmission or the downlink transmission by using a time division scheme,
   wherein the at least one processor is further configured to:
      determine whether to switch to the downlink transmission or to the uplink transmission, and
      switch to one of a fast Fourier transform mode and an inverse fast Fourier transform mode based on a result of the determining.

10. The remote radio unit of claim 9, wherein the at least one processor is further configured to adjust a period of time-domain data of the uplink transmission or the downlink transmission.

11. The remote radio unit of claim 10, wherein the at least one processor is further configured to, when the uplink transmission is switched to the downlink transmission, switch to the inverse fast Fourier transform mode, and increase the period of the time-domain data of the downlink transmission.

12. The remote radio unit of claim 11, wherein the at least one processor is further configured to:
   transform frequency-domain data of the downlink transmission into time-domain data; and increase a period of the transformed time-domain data of the downlink transmission.

13. The remote radio unit of claim 12, wherein the at least one processor is further configured to, increase the period of the time-domain data of the downlink transmission such that the time-domain data of the downlink transmission transformed in a first time domain is processed in a second time domain.

14. The remote radio unit of claim 10, wherein the at least one processor is further configured to, when the downlink transmission is switched to the uplink transmission, decrease the period of the time-domain data of the uplink transmission, and switch to the fast Fourier transform mode.

15. The remote radio unit of claim 14, wherein the at least one processor is further configured to transform the time-domain data of the uplink transmission having the decreased period into frequency-domain data.

16. The remote radio unit claim 15, wherein the at least one processor is further configured to, decrease the period of the time-domain data of the uplink transmission such that the time-domain data of the uplink transmission processed in a second time domain is processed in a first time domain.

17. The remote radio unit of claim 9, wherein the at least one processor further comprises:
an integrated transformer configured to switch to one of the fast Fourier transform mode and the inverse fast Fourier transform mode by using the time division scheme; and
a control signal generator configured to generate a signal for controlling the integrated transformer to switch to one of the fast Fourier transform mode and the inverse fast Fourier transform mode based on a result of the determining,
wherein the integrated transformer is further configured to perform one of fast Fourier transform and inverse fast Fourier transform based on a signal generated by the control signal generator.

18. The remote radio unit of claim 17, wherein the at least one processor further comprises:
a multiplexer;
a demultiplexer; and
a time-domain period adjuster configured to adjust a period of time-domain data of the uplink transmission or the downlink transmission,
wherein the integrated transformer is further configured to transform, into time-domain data, frequency-domain data of the downlink transmission transferred via the multiplexer, and
wherein the time-domain period adjuster is further configured to increase a period of time-domain data of the downlink transmission transferred via the demultiplexer.

19. The remote radio unit of claim 17, wherein the at least one processor further comprises:
a multiplexer;
a demultiplexer; and
a time-domain period adjuster configured to adjust a period of time-domain data of the uplink transmission or the downlink transmission,
wherein the time-domain period adjuster is further configured to decrease the period of the time-domain data of the uplink transmission,
wherein the integrated transformer is further configured to transform, into frequency-domain data, time-domain data of the uplink transmission having the decreased period, the time-domain data being transferred via the multiplexer, and
wherein the remote radio unit further comprises a fronthaul interface configured to transmit, to the baseband unit, frequency-domain data of the uplink transmission transferred via the demultiplexer.

20. A non-transitory computer-readable recording medium having recorded thereon a program that, when executed by a processor of a remote radio unit, causes the processor to:
process an uplink transmission or a downlink transmission by using a time division scheme;
determine whether to switch to the downlink transmission or to the uplink transmission, and
switch to one of a fast Fourier transform mode or an inverse fast Fourier transform mode based on a result of the determining.

* * * * *